United States Patent
Schell

(10) Patent No.: US 10,015,568 B2
(45) Date of Patent: Jul. 3, 2018

(54) OPTICALLY-ADDRESSABLE OPTICAL SWITCH

(71) Applicant: Fluke Corporation, Everett, WA (US)

(72) Inventor: J. David Schell, Austin, TX (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/290,807

(22) Filed: Oct. 11, 2016

(65) Prior Publication Data

US 2018/0103303 A1   Apr. 12, 2018

(51) Int. Cl.
| | | |
|---|---|---|
| H04B 10/08 | (2006.01) |
| H04B 17/00 | (2015.01) |
| H04J 14/00 | (2006.01) |
| H04Q 11/00 | (2006.01) |
| H04B 10/071 | (2013.01) |
| H04B 10/079 | (2013.01) |

(52) U.S. Cl.
CPC ....... *H04Q 11/0005* (2013.01); *H04B 10/071* (2013.01); *H04B 10/079* (2013.01); *H04Q 11/0062* (2013.01); *H04Q 2011/0015* (2013.01); *H04Q 2011/0039* (2013.01); *H04Q 2011/0073* (2013.01); *H04Q 2011/0083* (2013.01)

(58) Field of Classification Search
USPC ......................... 398/16, 19, 45, 51
See application file for complete search history.

(56) References Cited

U.S. PATENT DOCUMENTS

| | | | | |
|---|---|---|---|---|
| 5,018,130 A | * | 5/1991 | Suzuki .................. | H04L 49/106 398/51 |
| 5,130,835 A | * | 7/1992 | Stegmeier .......... | H04Q 11/0005 398/48 |
| 5,541,756 A | * | 7/1996 | Chang-Hasnain ...... | H04J 14/02 398/1 |
| 5,734,486 A | | 3/1998 | Guillemot et al. | |
| 5,900,957 A | * | 5/1999 | Van Der Tol ........... | H04J 14/06 370/35 |
| 6,580,537 B1 | * | 6/2003 | Chang ................. | H04J 14/0227 370/471 |
| 6,628,856 B1 | | 9/2003 | Costello et al. | |

(Continued)

OTHER PUBLICATIONS

B. H. Wang, "Demonstration of Gigabit WDMA Networks Using Parallelly Processed Subcarrier Hopping Pilot-Tone (P3) Signaling Technique", Jul. 7, 1996, IEEE Photonics Technology Letters, vol. 8, p. 1.*

(Continued)

*Primary Examiner* — David Payne
*Assistant Examiner* — Pranesh Barua
(74) *Attorney, Agent, or Firm* — Seed IP Law Group LLP

(57) ABSTRACT

An optically-addressable optical switch is disclosed. The optically-addressable optical switch receives, using an optical input, a first optical signal or portion of an optical signal and determines, based on the received optical signal, an address of an optical connector. The address is one of a plurality of addresses respectively corresponding to a plurality of optical connections of the optical switch. The optical switch subsequently receives a second optical signal or portion of an optical signal, using the same optical input, and outputs the second optical signal or portion of the optical signal to the optical connection corresponding to the determined address.

17 Claims, 6 Drawing Sheets

(56) References Cited

U.S. PATENT DOCUMENTS

| | | | | |
|---|---|---|---|---|
| 6,708,000 B1* | 3/2004 | Nishi | H04J 14/0227 | 398/1 |
| 6,850,707 B1* | 2/2005 | Chang | H04J 14/0227 | 370/390 |
| 8,670,110 B2 | 3/2014 | Schillab et al. | | |
| 8,692,984 B2 | 4/2014 | Schell et al. | | |
| 8,823,539 B2 | 9/2014 | Schell et al. | | |
| 2002/0027686 A1* | 3/2002 | Wada | H04Q 11/0005 | 398/87 |
| 2002/0109882 A1* | 8/2002 | Araki | H04L 49/30 | 398/101 |
| 2002/0118419 A1* | 8/2002 | Zheng | H04Q 11/0005 | 398/101 |
| 2002/0118420 A1* | 8/2002 | Liu | H04Q 11/0066 | 398/101 |
| 2002/0141018 A1* | 10/2002 | Chang | H04Q 11/0062 | 398/101 |
| 2003/0048506 A1* | 3/2003 | Handelman | H04Q 11/0005 | 398/48 |
| 2003/0133641 A1* | 7/2003 | Yoo | B82Y 20/00 | 385/14 |
| 2005/0111853 A1* | 5/2005 | Kawanishi | H04B 10/5563 | 398/187 |
| 2006/0159454 A1* | 7/2006 | Bjornstad | H04J 14/02 | 398/51 |
| 2007/0047956 A1* | 3/2007 | Shimizu | H04Q 11/0005 | 398/49 |
| 2007/0098404 A1* | 5/2007 | Wada | H04L 45/00 | 398/57 |
| 2007/0223921 A1* | 9/2007 | Sone | H04Q 11/0005 | 398/45 |
| 2008/0253768 A1* | 10/2008 | Yu | H04B 10/5165 | 398/51 |
| 2009/0092388 A1* | 4/2009 | Yang | H04B 10/071 | 398/13 |
| 2010/0027992 A1* | 2/2010 | Harada | H04Q 11/0005 | 398/19 |
| 2012/0014695 A1* | 1/2012 | Feuer | H04J 13/0003 | 398/65 |
| 2012/0155862 A1* | 6/2012 | Sato | H04B 10/0793 | 398/27 |
| 2012/0201538 A1* | 8/2012 | Uekama | H04L 45/62 | 398/51 |
| 2012/0243869 A1* | 9/2012 | Sato | H04J 14/0212 | 398/49 |
| 2012/0251109 A1* | 10/2012 | Mori | H04Q 11/0005 | 398/51 |
| 2012/0301139 A1* | 11/2012 | Mori | H04B 10/07953 | 398/26 |
| 2012/0315039 A1* | 12/2012 | Toyozumi | H04Q 11/08 | 398/53 |
| 2012/0328239 A1* | 12/2012 | Fuerst | H04J 14/0212 | 385/20 |
| 2013/0016967 A1* | 1/2013 | Sato | H04Q 11/0005 | 398/26 |
| 2013/0336662 A1* | 12/2013 | Murayama | H04B 10/116 | 398/130 |
| 2014/0161448 A1* | 6/2014 | Kaburagi | H04J 14/0204 | 398/48 |
| 2015/0155934 A1* | 6/2015 | Nakagawa | H04B 10/0775 | 398/34 |
| 2016/0072609 A1* | 3/2016 | Bhatnagar | H04J 14/0263 | 398/34 |
| 2016/0315709 A1* | 10/2016 | Kachita | H04B 10/564 | |

OTHER PUBLICATIONS

International Search Report and Written Opinion dated Jan. 22, 2018, for corresponding International Application No. PCT/US2017/056169, 13 pages.

Sercalo Microtechnology Ltd., "Fiber Optic 1×48 up to 1×256 Switch," accessed Oct. 13, 2016, at http://se055rz5.edis-lps.ch/products/pdfs/SC1x48-1x256SMF.pdf, 4 pgs.

Sercalo Microtechnology Ltd., "Latching Fiber Optic 1×8 Switch," accessed Oct. 13, 2016, at http://www.sercalo.com/products/pdfs/SLTS1x8.pdf, 2 pgs.

Sercalo Microtechnology Ltd., "Miniature Fiber Optic MEMS Switch," accessed Oct. 13, 2016, at http://www.sercalo.com/products/pdfs/SXLA2x2MMF.pdf, 3 pgs.

DiCon Fiberoptics, "GP750 Programmable Instrument," accessed Oct. 13, 2016, at http://www.diconfiberoptics.com/products/GP750/scd0175/0175d.pdf, 2 pgs.

DiCon Fiberoptics, "GP750 Fiber Optic Test Platform," accessed Oct. 13, 2016, at http://www.diconfiberoptics.com/products/GP750/gp750.php, 2 pgs.

"Cabling, Device enables standard VFLs, OTDRs to test MPO-terminated cables," Sep. 24, 2014; accessed Oct. 13, 2016, at http://www.cablinginstall.com/articles/2014/09/fibernext-mpo-switch.html, 2 pgs.

Schell, J. D., "Apparatus for Identifying Optical Array Polarity and Measuring Optical Signal Power or Loss," U.S. Appl. No. 14/830,564, filed Aug. 19, 2015, 32 pgs.

* cited by examiner

OPTICALLY-ADDRESSABLE OPTICAL SWITCH

BACKGROUND

Technical Field

This application is directed to an optical switch and, in particular, an optical switch that outputs an optical signal on a selected optical fiber.

Description of the Related Art

Conventional optical switches output an optical signal on one of a plurality of optical outputs. The optical output is typically selected by electrical means. For example, the optical switch may include a communications port, such as a universal serial bus (USB) port or a modem that is used to receive an electrical signal that directs the optical switch to select a particular optical output. However, selecting the optical output in this manner increases the complexity of the optical switch and devices to which the optical switch may be connected. The optical switch is required to include a dedicated communications device for receiving the optical output selection. Additionally, devices such as an optical time-domain reflectometer (OTDR) testing device with which the optical switch is connected are also required to include a dedicated communications device to provide the optical output selection to the optical switch.

The complexity of operating the optical switch and the testing device is also increased (for example, to test optical fibers of an optical fiber cable coupled to the optical switch). Personnel operating the optical switch and the testing device are required, in many circumstances, to both electrically couple and optically couple the testing device to the optical switch.

BRIEF SUMMARY

In an embodiment, an optical switch includes a splitting device having an input, and at least two outputs including a first output, and a second output. The splitting device is configured to receive, at the input, an optical signal having a plurality of portions including a first portion and a second portion, and output the first and second portions of the optical signal respectively at the first and second outputs. The optical switch includes an optical detector having an input optically coupled to the first output of the splitting device, and an output. The optical detector is configured to receive the first portion of the optical signal at the input, generate an electronic signal representative of information in the first portion of the optical signal, and transmit the electronic signal at the output.

The optical switch includes a controller having an input coupled to the output of the optical detector, and an output. The controller is configured to receive, at the input, the electronic signal representative of information in the first portion of the optical signal, determine an address of a plurality of addresses based on the electronic signal, and transmit, at the output, a control signal indicating the determined address. The optical switch includes a switch having an optical input optically coupled to the second output of the splitting device, a control input coupled to the output of the controller, and a plurality of optical outputs respectively associated with the plurality of addresses. The switch is configured to receive the second portion of the optical signal at the optical input, receive, at the control input, the control signal indicating the determined address, and output the second portion of the optical signal via an optical output of the plurality of optical outputs associated with the determined address.

In an embodiment, the first portion of the optical signal is modulated to specify an address of a respective optical output. In an embodiment, the splitting device is configured to output the first and second portions of the optical signal at both the first and second outputs, the optical detector is configured to receive the first and second portions of the optical signal at the input, generate the electronic signal representative of information in the first and second portions of the optical signal, the controller is configured to receive the electronic signal representative of information in the first and second portions of the optical signal, and determine the address based on the electronic signal, and the switch is configured to receive the first and second portions of the optical signal.

In an embodiment, the optical switch includes an optical connector having a plurality of optical connections respectively optically coupled to the plurality of optical outputs of the switch. In an embodiment, the second portion of the optical signal includes optical data for testing an optical fiber optically coupled to the optical output of the plurality of optical outputs. In an embodiment, the optical detector receives the first portion of the optical signal over a first time period starting on or after a commencement of reception of the optical signal and, based on reception of the first portion of the optical signal during the first time period, the optical detector determines that the first portion of the optical signal is carrying the address and outputs the electronic signal representative of information in the first portion of the optical signal.

In an embodiment, the first portion of the optical signal precedes the second portion of the optical signal. In an embodiment, the first portion of the optical signal has a first wavelength and the second portion of the optical signal has a second wavelength different from the first wavelength. In an embodiment, the optical detector is configured to determine that the first portion of the optical signal has the first wavelength, and in response to determining that the first portion of the optical signal has the first wavelength, determine that the first portion of the optical signal is carrying an address and output the electronic signal representative of information in the first portion of the optical signal.

In an embodiment, the first portion of the optical signal is a first type of light signal and the second portion of the optical signal is a second type of light signal different from the first type of light signal. In an embodiment, at least one of the first type and second type is at least one of laser light or monochromatic light. In an embodiment, the optical detector is configured to determine that the first portion of the optical signal is the first type of light signal and, in response to determining that the first portion of the optical signal is the first type of light signal, determine that the first portion of the optical signal is carrying an address and output the electronic signal representative of information in the first portion of the optical signal.

In an embodiment, an optical switch includes a splitting device having an input, a first output, and a second output. The splitting device is configured to receive, at the input, a first optical signal and a second optical signal, and output the first and second optical signals at the first and second outputs, respectively. The optical switch includes an optical detector having an input optically coupled to the first output of the splitting device, and an output. The optical detector is configured to receive the first optical signal at the input, generate an electronic signal representative of information in the first optical signal, and transmit the electronic signal at the output. The optical switch includes a controller having an input coupled to the output of the optical detector, and an output. The controller is configured to receive, at the input, the electronic signal representative of information in the first optical signal, determine an address of a plurality of addresses based on the electronic signal, and transmit, at the output, a control signal indicating the determined address.

The optical switch includes a switch having an optical input optically coupled to the second output of the splitting device, a control input coupled to the output of the controller, and a plurality of optical outputs respectively associated with the plurality of addresses. The switch is configured to receive the second optical signal at the optical input, receive, at the control input, the control signal indicating the determined address, and output the second optical signal via an optical output of the plurality of optical outputs associated with the determined address.

In an embodiment, the switch includes a microelectromechanical system (MEMS) mirror that is directable to reflect the first and second optical signals to the optical output of the plurality of optical outputs associated with the determined address. In an embodiment, the optical switch includes a plurality of connectors each having a respective set of optical connections of a plurality of sets of optical connections. An optical connection of the plurality of sets of optical connections is optically coupled to an optical output of the plurality of optical outputs.

In an embodiment, a method includes receiving, via an optical input, a first optical signal, determining, based on the first optical signal, an address of an optical connection, where the address is one of a plurality of addresses respectively corresponding to a plurality of optical connections, receiving, via the optical input, a second optical signal subsequent to the first optical signal, and outputting the second optical signal to an optical connection of the plurality of optical connections corresponding to the determined address.

In an embodiment, the first optical signal is modulated to specify the address of the optical connection. In an embodiment, the first optical signal is modulated using at least one of on-off keying, frequency shift keying, and pulse width modulation to specify the address. In an embodiment, the second optical signal includes optical data for testing an optical fiber optically coupled to the optical connection of the plurality of optical connections. In an embodiment, a wavelength of the first optical signal is different than a wavelength of the second optical signal. In an embodiment, a light source used to transmit the first optical signal is different than a light source used to transmit the second optical signal.

DETAILED DESCRIPTION

Figure 1:
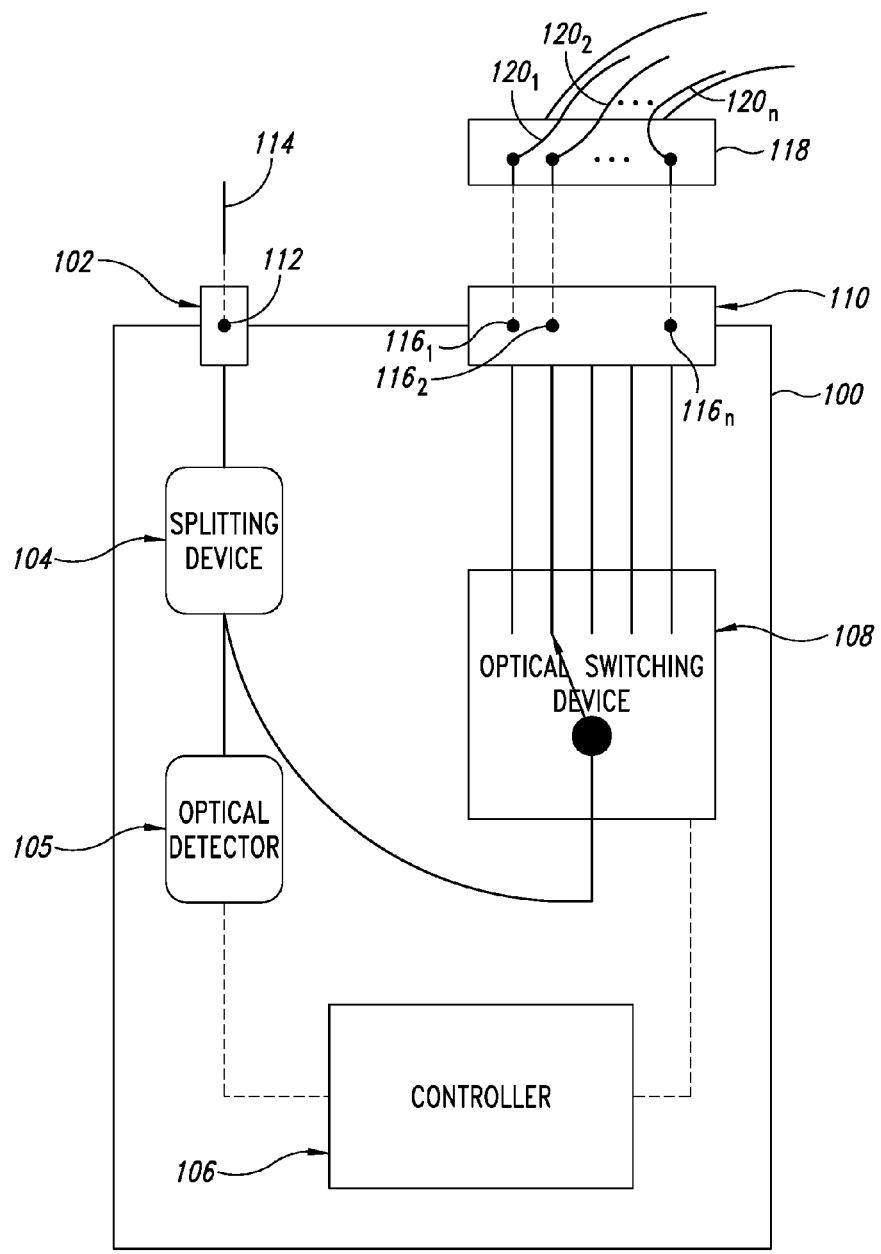
FIG. 1 shows a block diagram of an optical switch in accordance with at least one embodiment.

FIG. 1 shows a block diagram of an optical switch 100 in accordance with at least one embodiment. The optical switch 100 comprises an optical input connector 102, a splitting device 104, an optical detector 105, a controller 106, an optical switching device 108, and an optical output connector 110.

The optical input connector 102 has an input 112 and an output. The input 112 may be optically coupled to an optical fiber 114. The splitting device 104 has an input and first and second outputs. The input of the splitting device 104 is optically coupled to the output of the optical input connector 102.

The optical detector 105 has an input coupled to the first output of the splitting device 104 and an output. The controller 106 has an input electrically coupled to the output of the optical detector 105 and an output. The optical switching device 108 has an optical input optically coupled to the second output of the splitting device 104. The optical switching device 108 has an electrical input electrically coupled to the output of the controller 106. The optical switching device 108 also has a plurality of optical outputs.

The optical output connector 110 has a plurality of optical connections $116_{1-n}$ (singularly referred to herein as optical connection 116) respectively optically coupled to the plurality of optical outputs of the optical switching device 108. The optical output connector 110 may be connected with an optical connector 118. The optical connector 118 may have a plurality of optical fibers $120_{1-n}$ coupled thereto (singularly referred to herein as optical fiber 120).

The optical connector 118 and the optical output connector 110 may be any one of various types of connectors, such as multifiber push-on (MPO) connectors. The optical connector 118 and the optical output connector 110 may be compliant with one another such that, for example, they are sized and dimensioned to be connected with one another. When connected, the plurality of optical fibers 120 (or end faces thereof) of the optical connector 118 are optically connected to the plurality of optical connections 116 of the optical output connector 110. The two pluralities of optical fibers $120_{1-n}$, $116_{1-n}$ are axially aligned such that an optical wave traversing an optical connection 116 is received in an optical fiber 120 and vice-versa.

The optical switch 100 is connected at its optical input connector 102 to the optical fiber 114. The optical switch 100 receives an optical signal traversing the optical fiber 114. The optical switch 100 selects between any one of the plurality of optical connections $116_{1-n}$ of its optical output connector 110 and outputs the received optical signal on the selected optical connection. During the course of operation, the optical switch 100 may change or switch the optical connection 116 on which the optical signal is output.

The optical switch 100 is optically-addressable. The plurality of optical connections $116_{1-n}$ have a respective plurality of addresses. The optical switch 100 receives an address of an optical connection 116 of the plurality of optical connections $116_{1-n}$. In accordance with embodiments disclosed herein, the address may be communicated to the optical switch 100 using the optical signal received by the optical input connector 102. Upon analyzing the optical signal and detecting the address, the optical switch 100 outputs the optical signal on the optical connection 116 having the detected address.

Figure 2:
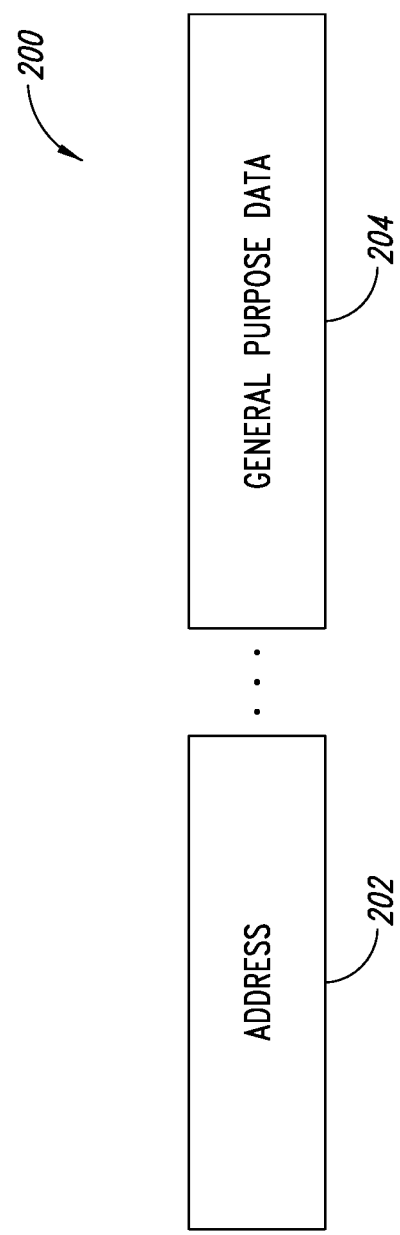
FIG. 2 shows an example of an optical signal for optically addressing the optical switch.

FIG. 2 shows an example of an optical signal 200 for optically addressing the optical switch 100. The optical signal 200 comprises a first portion 202 and a second portion 204. The first portion 202 includes an address. The second portion 204 is shown in FIG. 2 to include general purpose data. The address included in the first portion 202 is associated with one of the plurality of optical connections $116_{1-n}$. The first portion 202 of the optical signal 200 may temporally precede the second portion 204. The first portion 202 may be immediately before the second portion 204 or the first portion 202 may be separated from the second portion 204 by one or more intervening packets of data.

To allow for distinguishing or discriminating between the first portion 202 and the second portion 204 of the optical signal 200, the first and second portions 202, 204 may be transmitted over different time intervals. For example, the first portion 202 may be transmitted over a first period of time commencing on or after a beginning of the transmission of the optical signal 200. The second portion 204 may be transmitted subsequent to the first portion 202.

The first portion 202 may be modulated using any modulation technique, such as on-off keying, frequency shift keying, pulse width modulation, amplitude modulation (AM), frequency modulation (FM), phase shift keying (PSK), amplitude shift keying (ASK), and quadrature amplitude modulation (QAM) to communicate the address. The modulation of the first portion 202 may be used to indicate or signal the address. For example, on-off keying of the first portion 202 may be used to signal the address of the desired optical connection 116.

Even though the address is described herein as being in the first portion 202 of the optical signal 200, the address and the general purpose data may be included in separate signals, whereby, for example, a first signal may be address-carrying and a second signal may carry the general purpose data for outputting at the optical connection 116 having the address carried in the first signal.

In some embodiments, the first portion 202 may only be included in the optical signal 200 when an address associated with one of the plurality of optical connections $116_{1-n}$ changes. For example, if the same optical fiber is tested, there may not be a need to transmit the first portion 202 before every packet including test data.

To allow for distinguishing or discriminating between the first signal and the second signal, the two signals may be transmitted at different times or using different light sources. For example, any one of the signals may be transmitted using laser light, whereas another may be transmitted using a monochromatic light or a light emitting diode (LED). Alternatively or additionally, the two signals may have different wavelengths. Thus, the address-carrying first signal and the general purpose data-carrying second signal may be individually or uniquely identified by the optical switch 100 by their respective wavelength or respective type of light signal used in signal transmission.

Referring back to FIG. 1, the optical switch 100 receives the first portion 202 of the optical signal 200 over the input 112 of the optical input connector 102. The optical input connector 102 outputs the first portion 202 to the splitting device 104.

The splitting device 104 may in various embodiments be an optical splitter, a bent optical fiber, a wavelength division multiplexor (WDM) or a circulator. The splitting device 104 may be any type of device configured to receive a signal and output two or more versions or replicas of the received signal. An optical splitter, also known as a beam splitter, may have any type of coupling ratio, such as 50:50, 5:95 or 1:99. The coupling ratio represents the power of each output signal of the optical splitter as a percentage of the power of the input signal. For example, an optical splitter with a coupling ratio of 50:50 outputs two optical signals, each having half the power of the input optical signal. The optical splitter with a coupling ratio of 50:50 is referred to as a 3 decibel (dB) optical splitter due to the fact that the power of the output signal is halved or reduced by 3 dB in relation to the power of the input signal.

Alternatively, the splitting device 104 may be a bent optical fiber. Due to the bending part of the optical signal traversing the bent optical fiber will exit the optical fiber and is provided to the optical detector 105. The remainder of the optical signal, whose power is reduced due to the escaping signal, is provided to the optical switching device. Similar to the optical splitter, the bent optical fiber outputs at least two versions or replicas of the optical signal, each having reduced power compared to the received signal.

The splitting device 104 may be a wavelength division multiplexor that has an input and two or more outputs. The wavelength division multiplexor receives an optical signal over the input. The wavelength division multiplexor selects, based on a wavelength of the received signal, an output. The wavelength division multiplexor outputs the received signal over the selected output. For example, a received optical signal having a first wavelength may be output over a first output and not the second output, whereas a received optical signal having a second wavelength different from the first wavelength may be output over a second output and not the first output. Unlike the optical splitter or the bent optical fiber, which reduce the power of the output optical signal, the optical signal output by the wavelength division multiplexor has the same power as the input signal. The wavelength division multiplexor selects an output and outputs the optical signal over the selected output based on the wavelength of the optical signal.

Accordingly, if the address-carrying first portion 202 of the optical signal 200 has a first wavelength and the second portion 204 has a second wavelength different from the first wavelength, the wavelength division multiplexor outputs the first portion 202 over a first output different from a second output used for outputting the second portion 204. The first output may be optically coupled to an input of the optical detector 105. The second output may be optically coupled to an input of the optical switching device 108.

The splitting device 104 outputs a split version the first portion 202 of the optical signal 200 to the optical detector 105. The optical detector 105, which is also known as an optical transducer or electro-optical sensor, may be any type of device that is configured to convert an optical signal to a representative electronic signal. As such, the optical detector 105 may have the reverse function of a light emitter.

The optical detector 105 receives the first portion 202 and outputs an electronic signal representative of information, such as an address, included in the first portion 202. The controller 106 receives the electronic signal. The controller 106 determines, based on the electronic signal, the address carried by the electronic signal. For example, the first portion 202 of the optical signal 200 may be modulated using on-off keying, frequency shift keying or pulse width modulation, and the output electronic signal will represent the modulated information of the first portion 202.

Based on the address information represented in the electronic signal, the controller 106 outputs a control signal representing the address to the optical switching device 108. The control signal may instruct the optical switching device 108 to begin outputting a received optical signal to the optical connection 116 associated with the address.

The optical switching device 108 may, for example, be a microelectromechanical system (MEMS) optical switch having a mirror that is controlled to deflect the received optical signal to a specific optical connection 116. The optical switching device 108 receives the control signal over its electronic input. The optical switching device 108 also receives a split version of the optical signal 200 over its optical input that is optically coupled to the second output of the splitting device 104. In response to receiving the control signal, the optical switching device 108 outputs the received optical signal 200 to the optical connection 116 associated with the address. For example, if prior to receiving the control signal, the optical switching device 108 was outputting the received optical signal 200 to another optical connection 116, the optical switching device 108 will switch the optical communication path from its optical input to the optical connection 116 associated with the address determined based on the first portion 202 of the optical signal 200.

In various embodiments, the transmission of the second portion 204 of the optical signal 200 may be timed to allow switching to the addressed optical connection 116 to be completed. Following receipt of the first portion 202 of the optical signal 200, the controller 106 and the optical switching device 108 may require some time to switch to the addressed optical connection 116. The transmission of the second portion 204 may be timed or appropriately delayed such that switching to the addressed optical connection 116 is completed in time for receiving the second portion 204. Thus, the entirety of the second portion 204 will be output to the addressed optical connection 116. The possibility of outputting the second portion 204, or a part thereof, over another optical connection 116 (prior to completing the switching) is reduced.

The optical switch 100 may be used to conveniently and efficiently test a plurality of optical fibers of an optical fiber cable. Optical addressing of the optical switch 100 may be used to switch between the plurality of optical fibers under examination. That alleviates the need to mechanically connect and disconnect a test device or connector thereof to each optical fiber of the optical fiber cable to perform the test.

It is noted that in various embodiments the optical switch 100 may not include the optical input connector 102 or the optical output connector 110. For example, the optical switch 100 may be permanently connected to one or more input optical fibers and one or more output optical fibers.

In some embodiments, the controller 106 may be wirelessly connected to the optical switching device 108. The controller 106 may be connected to the optical switching device 108 using any type of communications protocol, such as Bluetooth® or an Institute of Electrical and Electronic Engineers (IEEE) 802 protocol. The controller 106 may wirelessly transmit the control signal representing the address to the optical switching device 108.

In some embodiments, the splitting device 104 may be incorporated in the optical switching device 108. For example, the optical switching device 108 may include a built-in splitting device that is fabricated together with the optical switching device 108. Further, the optical switching device 108 may also include the optical detector 105. The optical switching device 108 may also include control logic for determining the address included in the first portion 202 of the optical signal 200. The control logic may command the optical switching device 108 to output the optical signal 200 to an optical connection 116 associated with the determined address.

Figure 3:
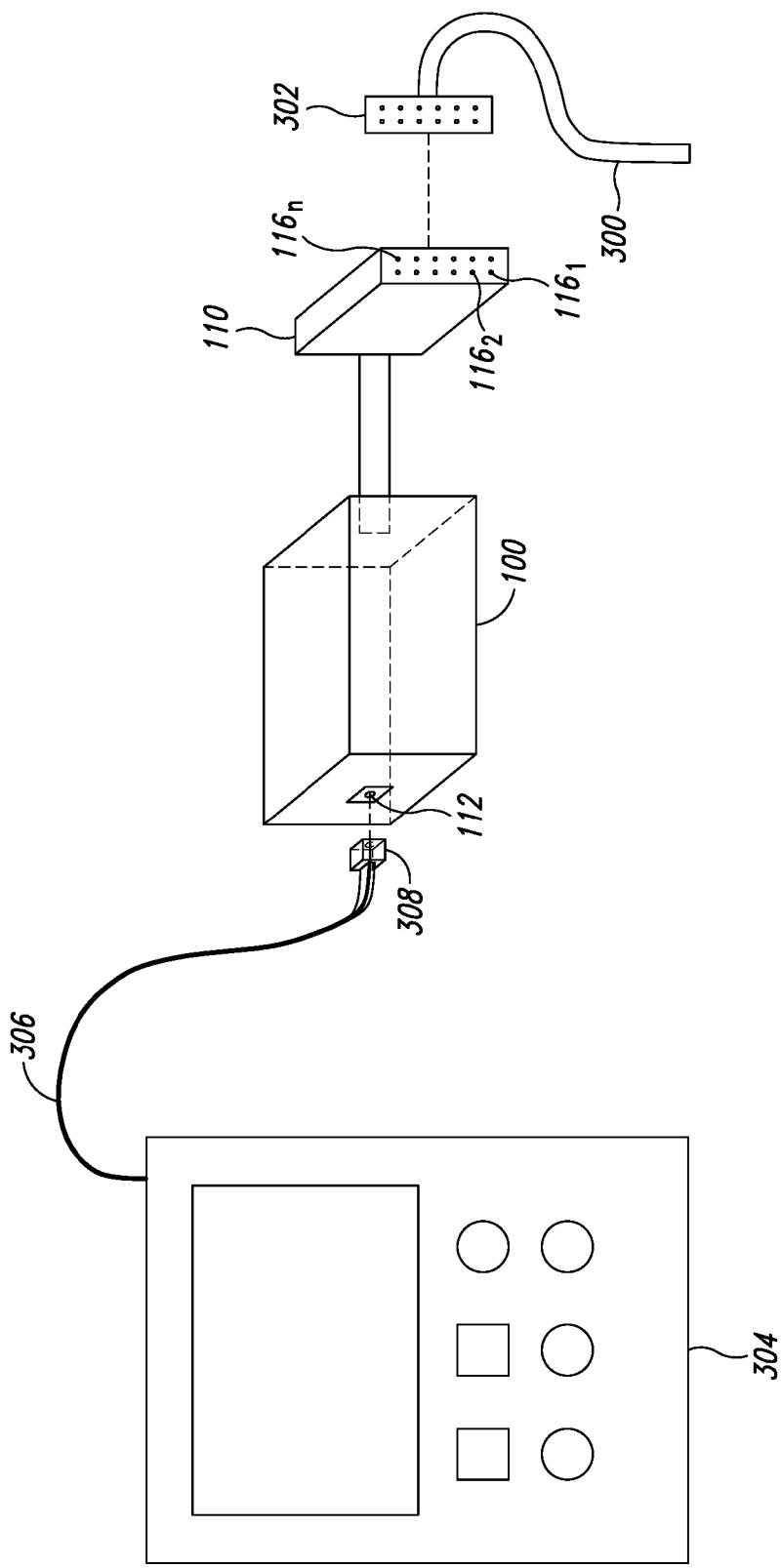
FIG. 3 shows an environment for testing an optical fiber cable.

FIG. 3 shows an environment for testing an optical fiber cable 300. The environment includes a testing device 304, the optical switch 100 and the optical fiber cable 300. The optical fiber cable 300 is terminated at a cable connector 302.

The testing device 304 may be any type of device that performs optical tests, such as an optical loss test set (OLTS), among others. For example, the testing device 304 may be an optical time-domain reflectometer (OTDR), among others. The testing device 304 may perform insertion loss or optical return loss test on optical fiber. Further, the testing device 304 may be used to determine the length of the optical fiber.

The testing device 304 outputs an optical signal with data modulated thereon through a testing device optical fiber 306 terminated at a connector 308. The connector 308 is connected to the optical input connector 102 of the optical switch 100. The connector 302 of the optical fiber cable 300 under test is connected to the optical output connector 110 of the optical switch 100.

To test the plurality of optical fibers of the optical fiber cable 300, the testing device 304 transmits a respective plurality of optical signals through the testing device optical fiber 306. A first optical signal of the plurality of optical signals includes a first portion (such as the first portion 202 described with reference to FIG. 2) that indicates an address associated with a first optical connection $116_1$ of the plurality of optical connections $116_{1-n}$ over which a second portion 204 of the first optical signal containing test data is to be output.

In response to receiving the first portion, the optical switch 100 outputs the second portion 204 of the optical signal 200 over the selected optical connection 116. The second portion 204 includes test data. The testing device 304 uses the optical signal bearing the test data to test a corresponding first optical fiber of the optical fiber cable 300 that is connected to the first optical connection $116_1$.

Upon completing the test, the testing device 304 tests a second optical fiber of the optical fiber cable 300. The testing device 304 outputs a second optical signal over the testing device optical fiber 306. Similar to the first optical signal, the second optical signal includes a first portion specifying an address of a second optical connection $116_2$ of the plurality of optical connections $116_{1-n}$. The second portion 204 includes test data for testing the second optical fiber of the optical fiber cable 300 that is optically coupled to the second optical connection $116_2$.

In a similar manner, the testing device 304 sequentially tests all of the plurality of optical fibers of the optical fiber cable 300. Once the plurality of optical fibers of the optical fiber cable 300 are tested, the connector 302 of the optical fiber cable 300 may be disconnected from the optical output connector 110 of the optical switch 100. Another cable or connector thereof may then be connected to the optical switch 100 and a similar test may be run on the other cable.

The optical switch 100 is advantageous in that it allows testing of all the optical fibers of the cable 300 without a need to connect and disconnect the connector 308 of the testing device 304 to each individual optical fiber under test. This saves time of the personnel operating the testing device 304 and reduces wear on the connector 308 of the testing device 304.

Optical cables and connectors may be compliant with one of a variety of industry standards and specifications that dictate, among others, the number and arrangement of optical connections associated with a cable or connector. For example, some connectors may have one row of eight connections, whereas other connectors may have one row of twelve connections or two rows of twelve connections each. As described herein, the optical switch 100 may have multiple optical output connectors. The optical output connectors and their optical connections may both be optically addressable.

It is noted that to perform an OLTS, a second testing device (not shown) may be coupled to the far end of the tested optical fiber of the optical fiber cable 300. The second testing device may be coupled to the far end of the optical fiber cable 300 via a second optical switch. The second optical switch may detect the optical signal transmitted over the tested optical fiber of the optical fiber cable 300. The second optical switch may determine the address based on the optical signal. The second optical switch may output, to the second testing device, data received over the optical connection associated with the address. Both the optical switch 100 and the second optical switch may use the same addressing convention for the optical connections. Utilizing the same addressing convention advantageously allows controlling both optical switches using the same address-carrying optical signal.

Figure 4:
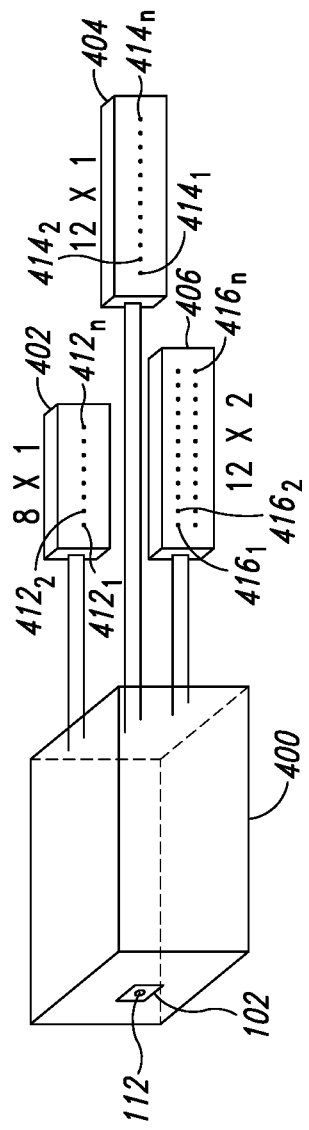
FIG. 4 shows an optical switch having a plurality of optical output connectors.

FIG. 4 shows an optical switch 400 having a plurality of optical output connectors 402, 404, 406. The optical switch 400 includes an optical input connector 102 having an optical input 112. Each optical output connector 402, 404, 406 has a respective plurality optical connections. A first optical output connector 402 has a first plurality of optical connections $412_{1-n}$ shown in FIG. 4 to be one row of eight optical connections. A second optical output connector 404 has a second plurality of optical connections $414_{1-n}$ shown to be one row of twelve optical connections, and a third optical output connector 406 has a third plurality of optical connections $416_{1-n}$ shown to be two rows each having twelve optical connections. Each optical connection of the plurality of optical connections $412_{1-n}$, $414_{1-n}$, $416_{1-n}$ may be uniquely addressable within the optical switch 400. The optical switch 400 may be used to test various types of optical cables having various types of connections.

In the example in FIG. 4, eight addresses may be respectively assigned to the first plurality of optical connections $412_{1-n}$ of the first optical output connector 402, twelve addresses may be respectively assigned to the second plurality of optical connections $414_{1-n}$ of the second optical output connector 404 and twenty four addresses may be respectively assigned to the third plurality of optical connections $416_{1-n}$ of the third optical output connector 406. Depending on the optical output connector 402, 404, 406 used to connect to an optical fiber cable under testing, a corresponding optical address for a desired optical connection may be provided in the first portion 202 of a transmitted optical signal 200.

Figure 5:
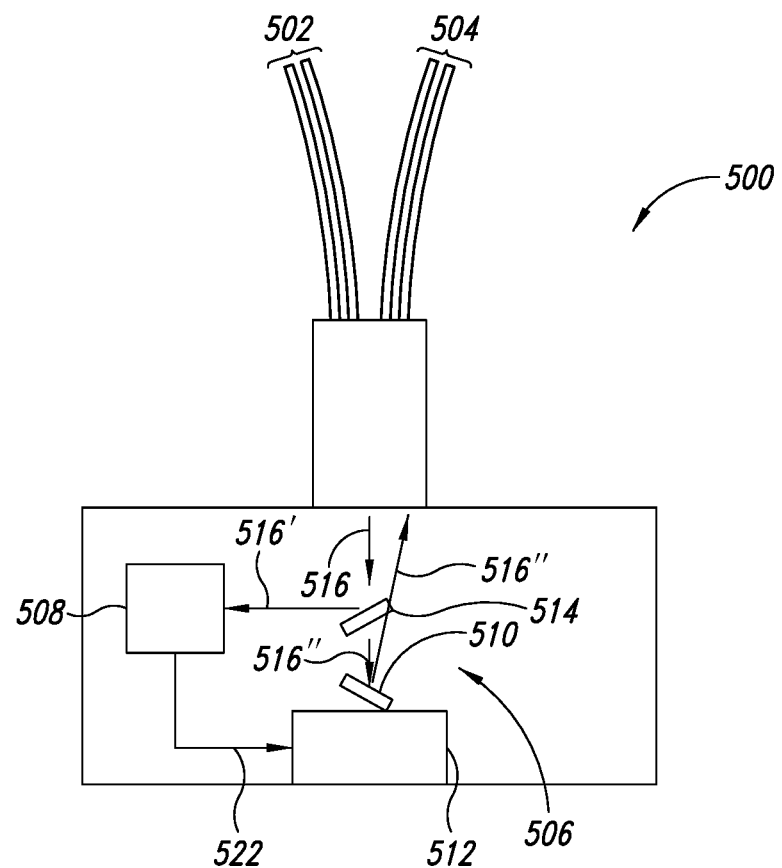
FIG. 5 shows an optical switch in accordance with at least one embodiment.

FIG. 5 shows an optical switch 500 in accordance with at least one embodiment. The optical switch 500 includes a plurality of optical input fibers 502, a plurality of optical output fibers 504, an optical switching device 506, and an optical detector 508. The optical switching device 506 includes a microelectromechanical system (MEMS) mirror 510, a controlling substrate 512 for controlling the MEMS mirror 510, and a splitting device 514. Although two optical input fibers 502 and two optical output fibers 504 are shown in FIG. 5, any number of optical input fibers or optical output fibers may be used without departing from the scope of the description herein. Each optical output fiber of the plurality of optical output fibers 504 is associated with a respective address of a plurality of addresses.

The optical switch 500 receives an optical signal 516 over an optical input fiber of the plurality of optical input fibers 502. The optical switch 500 outputs the optical signal 516 over an output optical fiber of the plurality of optical output fibers 504 based on an address detected in the optical signal 516. The MEMS mirror 510 of the optical switching device 506 reflects the received optical signal 516 to the desired optical output fiber of the plurality of optical output fibers 504. The placement of the MEMS mirror 510 (i.e., the angle that the MEMS mirror 510 makes with an axis) determines the optical output fiber over which the optical signal 516 is output. The MEMS mirror 510 is directable by the controlling substrate 512.

Upon receiving the optical signal 516, the splitting device 514 splits the optical signal 516 into two optical signals 516', 516". As described herein, the two optical signals 516', 516" may be versions or replicas of the received optical signal 516. However, each optical signal of the two optical signals 516', 516" may have a lower power level than the received optical signal 516. A first split optical signal 516' is provided to the optical detector 508 and a second split optical signal 516" is provided to the MEMS mirror 510.

The optical detector 508 converts the first split optical signal 516' to an electronic signal 522 and outputs the electronic signal 522 to the optical switching device 506. The electronic signal 522 is representative of information communicated in the first split optical signal 516'. As described herein, the first split optical signal 516' includes a first portion (described with reference to FIG. 2 herein). The first portion specifies an address of the output optical fiber of the plurality of output optical fibers 504.

The optical switching device 506 receives the electronic signal 522 from the optical detector 508. The controlling substrate 512 of the optical switching device 506 determines the address based on the electronic signal 522. The controlling substrate 512 positions the MEMS mirror 510 in accordance with the determined address. The controlling substrate 512 positions the MEMS mirror 510 such the MEMS mirror 510 outputs the second split optical signal 516" to the optical output fiber associated with the determined address.

It is noted that the optical splitting device 104 may not discriminate or distinguish between the first portion 202 and second portion 204 of the optical signal 200 and may output both portions 202, 204 to both the optical detector 105 and the optical switching device 108. Similarly, the optical detector 105 may output an electronic signal representative of both portions 202, 204 to the controller 106. The controller 106 may determine the address based on the first portion 202. Furthermore, the optical switching device 108 may output both portions 202, 204 on an optical connection 116 associated with the address included in the first portion 202.

Figure 6:
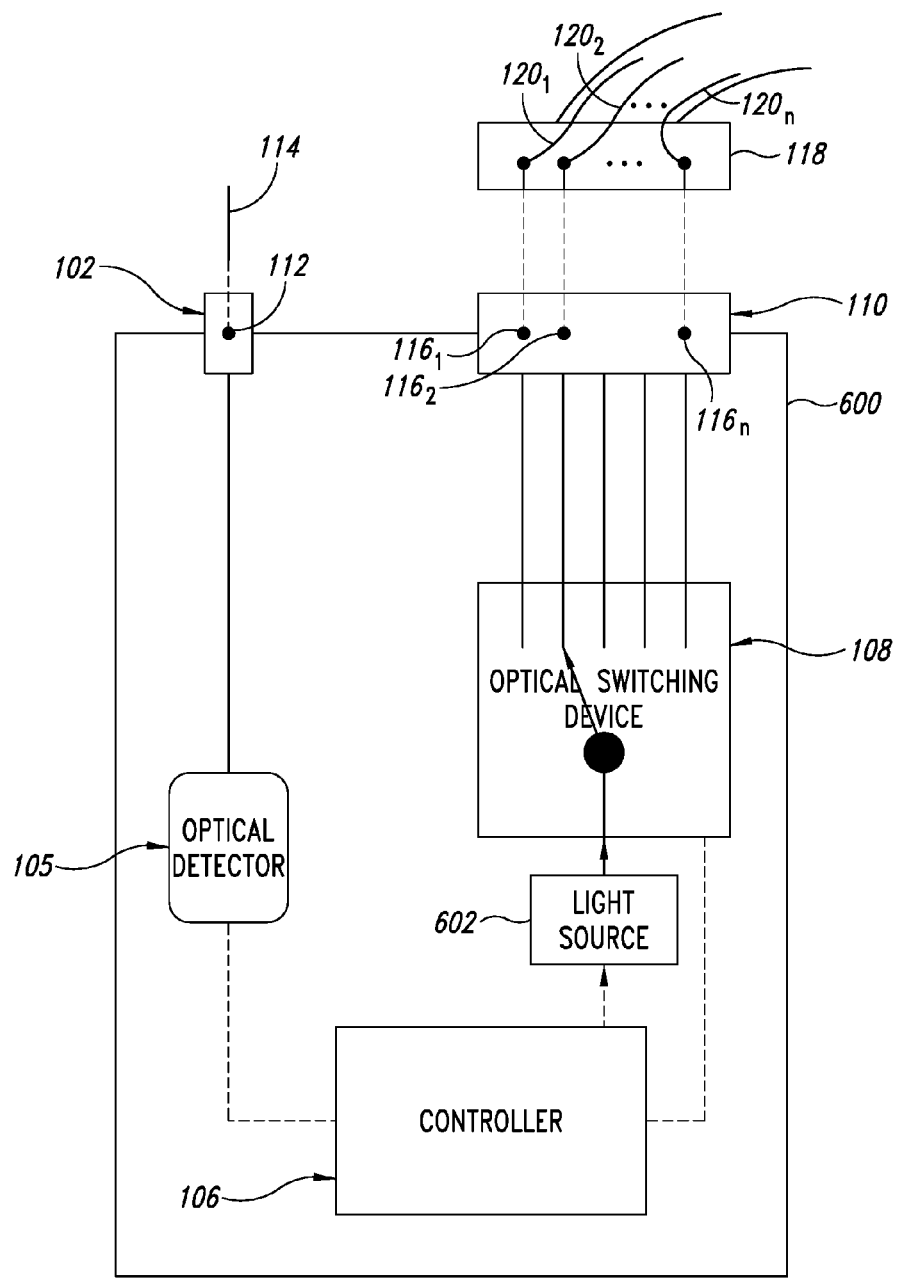
FIG. 6 shows a block diagram of an optical switch in accordance with at least one embodiment.

FIG. 6 shows a block diagram of an optical switch 600 in accordance with at least one embodiment. Elements of the optical switch 600 similar to those of the optical switch 100 described with reference to FIG. 1 have the same reference numerals. The optical switch 600 includes a light source 602, which may be an LED or a laser.

The optical detector 105 has an input optically coupled to the output of the optical input connector 102. The controller 106 has an input electrically coupled to the output of the optical detector 105 and first and second outputs. The first output of the controller 106 is electrically coupled to an input of the light source 602. The second output of the controller 106 is electrically coupled to the electrical input of the optical switching device 108. The light source 602 has an output optically coupled to the optical input of the optical switching device 108.

The optical detector 105 receives the optical signal 200 and outputs an electronic signal representative of the optical signal 200 to the controller 106. The controller 106 receives the electronic signal. The controller 106 determines, based on the electronic signal, the address carried by the electronic signal. The controller 106 may determine the address based on the first portion 202 of the optical signal 200. The controller 106 outputs a control signal representing the address to the optical switching device 108. The control signal may instruct the optical switching device 108 to begin outputting a received optical signal to the optical connection 116 associated with the address.

The controller 106 then outputs an electronic signal representative of the second portion 202 of the optical signal 200 to the light source 602. The light source 602 receives the electronic signal representative of the second portion 202 of the optical signal 200. The light source 602 converts the electronic signal into an optical signal and outputs the optical signal to the optical switching device 108. The optical switching device 108 outputs the optical signal to the optical connection 116 associated with the address received from the controller 106.

It should be appreciated that the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical switch, comprising: a splitting device having an input, and at least two outputs including a first output, and a second output, the splitting device being configured to: receive, at the input, an optical signal having a plurality of portions including a first portion and a second portion, and output the first and second portions of the optical signal respectively at the first and second outputs; an optical detector having an input optically coupled to the first output of the splitting device, and an output, wherein the optical detector is configured to: receive the first portion of the optical signal at the input, generate an electronic signal representative of information in the first portion of the optical signal, and transmit the electronic signal at the output; a controller having an input coupled to the output of the optical detector, and an output, wherein the controller is configured to: receive, at the input, the electronic signal representative of information in the first portion of the optical signal, determine an address of a plurality of addresses based on the electronic signal, and transmit, at the output, a control signal indicating the determined address; a plurality of optical output connectors having a respective plurality of optical connections organized in arrays of different array sizes, the plurality of optical connections having a respective plurality of connector optical inputs and connector optical outputs; and a switch having an optical input optically coupled to the second output of the splitting device, a control input coupled to the output of the controller, and a plurality of optical outputs respectively coupled to the plurality of connector optical inputs of the plurality of optical connections and respectively associated with the plurality of addresses, the switch being configured to: receive the second portion of the optical signal at the optical input, receive, at the control input, the control signal indicating the determined address, and output the second portion of the optical signal via an optical output of the plurality of optical outputs associated with the determined address.

2. The optical switch of claim 1, wherein the first portion of the optical signal is modulated to specify an address of a respective optical output.

3. The optical switch of claim 1, wherein the second portion of the optical signal includes optical data for testing an optical fiber optically coupled to an optical output connector of the plurality of optical output connectors.

4. The optical switch of claim 1, wherein the optical detector receives the first portion of the optical signal over a first time period starting on or after a commencement of reception of the optical signal and, based on reception of the first portion of the optical signal during the first time period, the optical detector determines that the first portion of the optical signal is carrying the address and outputs the electronic signal representative of information in the first portion of the optical signal.

5. The optical switch of claim 1, wherein the first portion of the optical signal precedes the second portion of the optical signal.

6. The optical switch of claim 1, wherein the first portion of the optical signal has a first wavelength and the second portion of the optical signal has a second wavelength different from the first wavelength.

7. The optical switch of claim 6, wherein the optical detector is configured to determine that the first portion of the optical signal has the first wavelength, and in response to determining that the first portion of the optical signal has the first wavelength, determine that the first portion of the optical signal is carrying an address and output the electronic signal representative of information in the first portion of the optical signal.

8. The optical switch of claim 1, wherein the first portion of the optical signal is a first type of light signal and the second portion of the optical signal is a second type of light signal different from the first type of light signal, wherein at least one of the first type and second type is at least one of laser light or monochromatic light.

9. The optical switch of claim 8, wherein the optical detector is configured to determine that the first portion of the optical signal is the first type of light signal and, in response to determining that the first portion of the optical signal is the first type of light signal, determine that the first portion of the optical signal is carrying an address and output the electronic signal representative of information in the first portion of the optical signal.

10. An optical switch, comprising: a splitting device having an input, a first output, and a second output, the splitting device being configured to: receive, at the input, a first optical signal and a second optical signal, and output the first and second optical signals at the first and second outputs, respectively; an optical detector having an input optically coupled to the first output of the splitting device, and an output, wherein the optical detector is configured to: receive the first optical signal at the input, generate an electronic signal representative of information in the first optical signal, and transmit the electronic signal at the output; a controller having an input coupled to the output of the optical detector, and an output, wherein the controller is configured to: receive, at the input, the electronic signal representative of information in the first optical signal, determine an address of a plurality of addresses based on the electronic signal, and transmit, at the output, a control signal indicating the determined address; a plurality of optical output connectors having a respective plurality of optical connections organized in arrays of different array sizes, the plurality of optical connections having a respective plurality of connector optical inputs and connector optical outputs; and a switch having an optical input optically coupled to the second output of the splitting device, a control input coupled to the output of the controller, and a plurality of optical outputs respectively coupled to the plurality of connector optical inputs of the plurality of optical connections and respectively associated with the plurality of addresses, the switch being configured to: receive the second optical signal at the optical input, receive, at the control input, the control signal indicating the determined address, and output the second optical signal via an optical output of the plurality of optical outputs associated with the determined address.

11. The optical switch of claim 10, wherein the switch includes a microelectromechanical system (MEMS) mirror that is directable to reflect the second optical signal to the optical output of the plurality of optical outputs associated with the determined address.

12. A method, comprising:
receiving, via an optical input of a splitting device, an optical signal having a plurality of portions including a first portion and a second portion;
outputting, by the splitting device, the first portion and the second portion at a first output and a second output of the splitting device, respectively;
receiving, by an optical detector coupled to the first output of the splitting device, the first portion of the optical signal;
generating, by the optical detector, an electronic signal representative of information in the first portion of the optical signal;
outputting, at an output of the optical detector, the electronic signal;
determining, by a controller coupled to the output of the optical detector, an address of a plurality of addresses based on the electronic signal;
outputting, by the controller, a control signal indicating the determined address;
receiving, by a switch coupled to the second output of the splitting device, the second portion of the optical signal, the switch having a plurality of optical outputs respectively coupled to a plurality of connector optical inputs of a plurality of optical connections organized in arrays of different array sizes, each array belonging to an optical output connector of a plurality of optical output connectors, the plurality of optical connections coupling the plurality of connector optical inputs to a respective plurality of connector optical outputs;
receiving, by the switch, the control signal indicating the determined address; and
outputting, by the switch, the second portion of the optical signal to the optical connection of the plurality of optical connections corresponding to the determined address.

13. The method of claim 12, wherein the first portion of the optical signal is modulated to specify the address of the optical connection.

14. The method of claim 13, wherein the first portion of the optical signal is modulated using at least one of on-off keying, frequency shift keying, and pulse width modulation to specify the address.

15. The method of claim 12, wherein the second portion of the optical signal includes optical data for testing an optical fiber optically coupled to the optical connection of the plurality of optical connections.

16. The method of claim 12, wherein a wavelength of the first portion of the optical signal is different than a wavelength of the second portion of the optical signal.

17. The method of claim 12, wherein a light source used to transmit the first portion of the optical signal is different than a light source used to transmit the second portion of the optical signal.

* * * * *